United States Patent Office 2,784,188
Patented Mar. 5, 1957

2,784,188
SYNTHESIS OF 4,5-DIAMINO-6-DIMETHYLAMINO PYRIMIDINE

Robert Bruce Angier, Pearl River, and Joseph William Marsico, Nanuet, N. Y., assignors to American Cyanamid Company, New York, N. Y., a corporation of Maine No Drawing. Application November 18, 1954, Serial No. 469,829

5 Claims. (Cl. 260—256.4)

This invention relates to a new class of substituted pyrimidines. More particularly, this invention is concerned with 4,5-diamino-6-substituted-aminopyrimidines, salts thereof and methods for their preparation.

The new pyrimidines of this invention may be represented by the following structural formula:

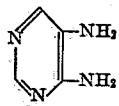

wherein R represents a member selected from the group consisting of alkylamino, arylamino, alkylaralkylamino, alkylarylamino, dialkylamino, N,N-pentamethyleneamino and N,N-oxapentamethyleneamino radicals. Useful alkylamino groups are methylamino, ethylamino, propylamino, butylamino, isopropylamino, and isobutylamino; arylamino such as phenylamino, p-chlorophenylamino, m-chlorophenylamino, o-chlorophenylamino and p-nitrophenylamino; alkylaralkyl groups such as N-methyl-N-benzylamino, N-ethyl-N-benzylamino, N-propyl-N-benzylamino, N-butyl-N-benzylamino and N-butyl-N-naphthylmethylamino; alkylarylamino such as N-methyl-N-phenylamino-N-ethyl-N-phenyl, N-propyl-N-phenylamino, N-butyl-N-phenylamino, N-isopropyl-N-p-chlorophenylamino; dialkylamino such as dimethylamino, diethylamino; dipropylamino, dibutylamino, and diisopropylamino; N,N-pentamethyleneamino such as piperidino and 3-chloropiperidino; N,N-oxapentamethyleneamino such as morpholino and 2-chloromorpholino.

Inasmuch as the new pyrimidines of the above formula are amine bases, they form acid-addition salts with strong acids as illustrated by hydrochloric acid, sulfuric acid and picric acid. These acid addition salts are valuable, particularly in the isolation and purification of the new pyrimidines and it is intended that they also constitute a part of the present invention.

The new substituted pyridimine compounds of this invention are useful in the field of organic synthesis. They can, for example, be employed as intermediates in the preparation of substituted purines by the process disclosed in co-pending U. S. application S. N. 469,828, now abandoned, by Leon Goldman and Joseph W. Marsico filed concurrently herewith and which comprises heating a 4,5-diamino-6-substituted-aminopyrimidine in the presence of acetic anhydride and ethylorthoformate to effect ring closure. The resulting 6-substituted aminopurine can be condensed, in the form of its chloromercury salt, with a fully acylated haloamino sugar to produce the biologically active, trypanosomicidal aminonucleosides. For example, 6-dimethylaminopurine as the chloromercury salt may be reacted with 1-acetyl-2,5-dibenzoyl-3-acetamino-D-ribofuranoside as the titanium tetrachloride complex to obtain 6-dimethylamino-9-(3'-amino-β-D-ribofuranosyl)purine after deacylation, in accordance with the procedure of Baker et al., J. A. C. S. 76, 4044 (1954). The compound has further utility as an intermediate for preparing the antibiotic puromycin in that it can be reacted with the N-blocked carboxy-activated form of p-methoxyphenylalanine to yield 6-dimethylamino-9-(3-p-methoxyphenylalanylamino-β-D-ribofuranosyl)purine, a compound found to be powerful in eliminating trypanosomes of the evansi and erucei groups from the blood of infected animals. The method for condensing the aminonucleoside with amino acids is described by Baker et al. in J. A. C. S. 76, 2838 (1954).

A wide variety of methods may be employed by those skilled in the art for the preparation of the compounds of this invention. However, we have discovered a particularly useful method and it is intended that this method also constitute a part of the present invention. In accordance with our process 2-alkylmercapo-4,5-diamino-6-substituted-aminopyrimidine is treated with a low temperature Raney nickel catalyst whereby the substituted mercapo group is replaced by hydrogen. This new reaction can be illustrated by the following equation:

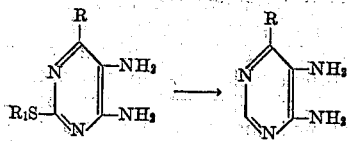

wherein R has the values assigned above and R₁ is a lower alkyl group, as for example, —CH₃, —C₂H₅, —C₃H₇ or —C₄H₉.

Low temperature-Raney nickel catalyst is a material well known to those skilled in the art. It is prepared in a manner identical to the procedure usually employed for the preparation of Raney nickel except that the temperature after the addition of the alloy is maintained at about 80° C. or preferably even lower, for instance, 50° C. The low temperature-Raney nickel thus prepared contains a large percentage of hydrogen (the exact percentage can readily be determined by simple tests well known to those skilled in the art) so that the catalyst can be employed in reduction reactions without the further addition of hydrogen. The low temperature-Raney nickel catalyst should be employed in an amount at least sufficient to furnish the quantity of hydrogen theoretically necessary for the desired reduction and preferably a considerable excess. A 2 to 10-fold excess has been found to give excellent results.

The new reaction of this invention may advantageously be conducted in an inert solvent as illustrated by the lower alcohols, glycol, methyl Cellosolve, glycol ethers and aromatic hydrocarbon solvents. Methyl Cellosolve is the preferred solvent. The reaction can be conducted at any convenient temperature, for instance from about 25° C. to 150° C., although best results are usually obtained at temperatures in the range from 60° C. to 100° C. At 25° C. the reaction is, in most instances, substantially complete in from about 1 to 24 hours, and at about 80° C. the reaction is usually substantially complete in about ¼ to 1 hour.

The following examples are submitted as being illustrative of our invention. They are not intended, however, to limit the scope thereof.

Example 1

Two parts by weight of 2-methylmercapto-4,5-diamino-6-dimethylamine-pyrimidine was dissolved in 30 parts by volume of methyl Cellosolve and to this was added a slurry of 60 parts by weight of Raney nickel catalyst in 50 parts by volume of methyl Cellosolve. The mixture was heated on a steam bath for one hour. The catalyst was filtered hot and washed thoroughly in hot methyl Cellosolve. The filtrate and washings were combined and evaporated in vacuo to a solid residue. This was heated in 30 parts by volume of benzene and filtered from any insoluble residue. Upon cooling the filtrate, the product crystallized. This product had a melting point of 150° C. to 152° C. Recrystallization from benzene gave 4,5-diamino-6-dimethylaminopyrimidine, having a melting point of 156° C. to 158° C.

*Example II*

20 parts by weight of 2-methylmercapto-4,5-diamino-6-dimethylamino-pyrimidine was dissolved by warming in 200 parts by volume of methyl Cellosolve. To this was added a slurry of 200 parts by weight of Raney nickel catalyst in 200 parts by volume of methyl Cellosolve. The mixture was heated on a steam bath with stirring for one hour. The catalyst was filtered off while hot and then washed with methyl Cellosolve and water. The filtrate and washings were combined and concentrated to dryness under reduced pressure. The residual solid 4,5-diamino-6-dimethylamino-pyrimidine was recrystallized from 350 parts by volume of benzene to yield the purified product, melting at 157° C. to 159° C.

*Example III*

2 - methylmercapto - 4 - amino - 6 - methylamino - pyrimidine may be nitrosated to 2-methylmercapto-4-amino-5-nitroso-6-methylamino pyrimidine by treatment with nitrous acid. Reduction of this compound with sodium hydrosulfite yields 2-methylmercapto-4,5-diamino-6-methylamino-pyrimidine which may be dissolved in ethyl alcohol and the mixture heated at steam bath temperature in the presence of Raney nickel catalyst for one hour. The product, 4,5-diamino-6-methylamino-pyrimidine may be separated by filtration and recrystallized from benzene.

*Example IV*

2 - methylmercapto - 4 - amino - 6 - phenylamino - pyrimidine may be nitrosated to 2-methylmercapto-4-amino-5-nitroso-6-phenylamino-pyrimidine by treatment with nitrous acid. Reduction of this compound with sodium hydrosulfite yields 2-methylmercapto-4,5-diamino-6-phenylamino-pyrimidine. This compound, upon dissolution in methyl Cellosolve and heating at steam bath temperature for a period of about one hour in the presence of Raney nickel catalyst yields 4,5-diamino-6-phenylamino-pyrimidine. This product may be separated from the reaction mixture by filtration and recrystallized from benzene.

The invention may be further illustrated by the following examples. Each of these compounds may be prepared in accordance with the conditions set forth in Example I, employing corresponding 2-alkylmercapto-4,5-diamino-6-substituted pyrimidines as starting materials:

4,5-diamino-6-methylamino-pyrimidine
4,5-diamino-6-diethylamino-pyrimidine
4,5-diamino-6-diisopropylamino-pyrimidine
4,5-diamino-6-dipropylamino-pyrimidine
4,5-diamino-6-butylamino-pyrimidine
4,5-diamino-6-N-methyl-N-benzylamino-pyrimidine
4,5-diamino-6-N-propyl-N-benzylamino-pyrimidine
4,5-diamino-6-phenylamino-pyrimidine
4,5-diamino-6-m-chlorophenylamino-pyrimidine
4,5-diamino-6-piperidino-pyrimidine
4,5-diamino-6-N-ethyl-N-phenyl-pyrimidine
4,5-diamino-6-N-isopropyl-N-p-chlorophenyl-pyrimidine
4,5-diamino-6-morpholino-pyrimidine

We claim:

1. A method of preparing compounds having the general formula:

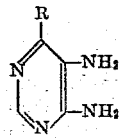

in which R is a member selected from the group consisting of di-lower-alkylamino and mononuclear-arylamino radicals and salts thereof with strong acids, which comprises contacting with a low temperature Raney nickel catalyst, a compound selected from the group consisting of a 2-methylmercapto - 4,5 - diamino - 6 - di - lower - alkylamino-pyrimidine and a 2-methylmercapto-4,5-diamino-6-mononuclear-arylamino-pyrimidine.

2. The method which comprises contacting a 2-methylmercapto - 4,5 - diamino - 6 - di - lower - alkylamino - pyrimidine with a low temperature Raney nickel catalyst, said contact being effected in an inert solvent and at a temperature of from about 60° C. to 100° C.

3. A method which comprises contacting a 2-methylmercapto - 4,5 - diamino - 6 - dialkylamino - pyrimidine with a low temperature Raney nickel catalyst, said contact being effected in an inert solvent and at a temperature of from about 60° C. to 100° C.

4. The method of claim 3, when the 2-methylmercapto-4,5-diamino-6-dialkylamino-pyrimidine is 2-methylmercapto-4,5-diamino-6-dimethylamino-pyrimidine.

5. The method of claim 3, when the 2-methylmercapto-4,5-diamino-6-dialkylamino-pyrimidine is 2-methylmercapto-4,5-diamino-6-diethylamino-pyrimidine.

References Cited in the file of this patent

UNITED STATES PATENTS 2,407,204    English et al. ———————— Sept. 3, 1946